US011973279B2

(12) United States Patent
Futagami et al.

(10) Patent No.: US 11,973,279 B2
(45) Date of Patent: Apr. 30, 2024

(54) ANTENNA DEVICE AND COMMUNICATION APPARATUS

(71) Applicant: Murata Manufacturing Co., Ltd., Nagaokakyo (JP)

(72) Inventors: Dai Futagami, Nagaokakyo (JP); Takaya Nemoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 490 days.

(21) Appl. No.: 17/213,259

(22) Filed: Mar. 26, 2021

(65) Prior Publication Data

US 2021/0234278 A1 Jul. 29, 2021

Related U.S. Application Data

(63) Continuation of application No. PCT/JP2019/033977, filed on Aug. 29, 2019.

(30) Foreign Application Priority Data

Sep. 27, 2018 (JP) ................................ 2018-181164

(51) Int. Cl.

| | |
|---|---|
| ***H01Q 9/04*** | (2006.01) |
| ***H01Q 13/08*** | (2006.01) |
| ***H01Q 21/06*** | (2006.01) |

(52) U.S. Cl.

CPC ............ *H01Q 9/0435* (2013.01); *H01Q 9/04* (2013.01); *H01Q 13/08* (2013.01); *H01Q 21/06* (2013.01); *H01Q 21/065* (2013.01)

(58) Field of Classification Search

CPC .... H01Q 9/0435; H01Q 21/065; H01Q 13/08; H01Q 9/04; H01Q 21/06

(Continued)

(56) References Cited

U.S. PATENT DOCUMENTS

2004/0119646 A1* 6/2004 Ohno .................. H01Q 9/0485 343/700 MS

2008/0142916 A1 6/2008 Baldi (Continued)

FOREIGN PATENT DOCUMENTS

EP 0 280 379 A2 8/1988

JP 63-224507 A 9/1988

(Continued)

OTHER PUBLICATIONS

Japanese Office Action dated Sep. 14, 2021, in corresponding Japanese Patent Application No. 2020-548244.

(Continued)

*Primary Examiner* — Hai V Tran

(74) *Attorney, Agent, or Firm* — XSENSUS LLP

(57) ABSTRACT

A patch antenna is constituted by a radiation element disposed on a substrate and a ground conductor disposed in the substrate. A dielectric member is disposed to cover the radiation element and a body of a resin material is disposed to cover the dielectric material as viewed from above. The dielectric member is disposed on a side opposite a side on which the ground conductor is disposed as viewed from the radiation element. When a direction of a normal line to the radiation element is assumed as a height direction, a line which links centroids of horizontal sectional surfaces of the dielectric member in the height direction leans with respect to the direction of the normal line to the radiation element.

20 Claims, 15 Drawing Sheets

(58) Field of Classification Search
USPC .......................................................... 343/893
See application file for complete search history.

(56) References Cited

U.S. PATENT DOCUMENTS

| | | | | |
|---|---|---|---|---|
| 2015/0346334 | A1 | 12/2015 | Nagaishi et al. | |
| 2019/0027804 | A1* | 1/2019 | Kim | H01L 24/20 |

FOREIGN PATENT DOCUMENTS

| | | | |
|---|---|---|---|
| JP | 1-243605 | A | 9/1989 |
| JP | 3-10407 | A | 1/1991 |
| JP | 5-48319 | A | 2/1993 |
| JP | 7-249931 | A | 9/1995 |
| JP | 2015-213285 | A | 11/2015 |
| JP | 2015-226297 | A | 12/2015 |
| WO | 2014/125716 | A1 | 8/2014 |

OTHER PUBLICATIONS

International Search Report and Written Opinion dated Oct. 1, 2019, received for PCT Application PCT/JP2019/033977, Filed on Aug. 29, 2019, 9 pages including English Translation.
Chinese Office Action dated May 17, 2023, in corresponding Chinese Patent Application No. 201980063763.1, 11pp.
Written Opinion of the International Searching Authority dated Oct. 1, 2019, received for PCT Application PCT/JP2019/033977, Filed on Aug. 29, 2019, 6 pages. (Previously filed; submitting English translation only.).

* cited by examiner

ANTENNA DEVICE AND COMMUNICATION APPARATUS

CROSS-REFERENCE TO RELATED APPLICATIONS

The present application is a continuation of and claims priority to PCT/JP2019/033977, filed Aug. 29, 2019, which claims priority to JP 2018-181164, filed Sep. 27, 2018, the entire contents of each are incorporated herein by its reference.

TECHNICAL FIELD

The present disclosure relates to an antenna device and a communication apparatus.

BACKGROUND ART

A dielectric-loaded array antenna including plural unit antennas is known in which a dielectric equivalent is disposed on each of the unit antennas (see Patent Document 1). Patch antennas are used as the unit antennas, and a dielectric having the shape of a rectangular parallelepiped is disposed on each of the patch antennas. The length, the width, and the height of the dielectric are respectively 1.25 times, 1.25 times, and 1.42 times as large as the wavelength. By disposing the dielectric in this manner, the aperture efficiency of each unit antenna is enhanced.

CITATION LIST

Patent Document

Patent Document 1: Japanese Unexamined Patent Application Publication No. H01-243605

SUMMARY

Technical Problems

As recognized by the present inventor, in a known patch antenna, the antenna gain in the direction directly in front of the patch antenna is maximized. Depending on the purpose of the antenna, however, it may be desirable to increase the antenna gain in a direction leaning (or tilted) from the direction directly in front of the antenna. In light of the feature, the present disclosure describes an antenna device and a communication apparatus that are able to increase the antenna gain in a direction leaning from the direction directly in front of the antenna device.

Solutions

According to an aspect of the present disclosure, there is provided an antenna device including a substrate, a patch antenna, and a dielectric member. The patch antenna includes a radiation element disposed on the substrate, and a ground conductor disposed in or on the substrate. The dielectric member is disposed to at least partially cover, in a plan view, the radiation element, and is disposed on a side opposite a side on which the ground conductor is disposed as viewed from the radiation element. A body of resin material covers one or more sides of the dielectric member that are not in contact with the ground conductor or substrate. Under a condition a direction of a normal line to the radiation element is assumed as a height direction, a line which links centroids of horizontal sectional surfaces of the dielectric member in the height direction leans with respect to the direction of the normal line to the radiation element.

According to another aspect of the present disclosure, there is provided a communication apparatus including a housing and an antenna device contained in the housing. The antenna device includes a substrate and a patch antenna. The patch antenna includes a radiation element and a ground conductor, the radiation element being disposed in or on the substrate, the ground conductor being disposed in or on the substrate. The housing has a boundary surface, a permittivity of one side of the boundary surface being different from a permittivity of another side of the boundary surface, a high permittivity region on the one side of the boundary surface and a low permittivity region on the another side of the boundary surface being separated from each other by the boundary surface in an in-plane direction of the radiation element. The high permittivity region has another surface that does not oppose the low permittivity region and is at least partially covered by a body of resin material. The boundary surface tilts with respect to a top surface of the radiation element, and at least part of the boundary surface overlaps at least part of the radiation element from a plan view.

Advantageous Effects

By disposing the above-described dielectric member, it is possible to increase the antenna gain in a direction leaning from the direction directly in front of a radiation element.

DESCRIPTION OF EMBODIMENTS

First Embodiment

An antenna device according to a first embodiment will be described below with reference to FIGS. 1 through 3.

Figure 1:
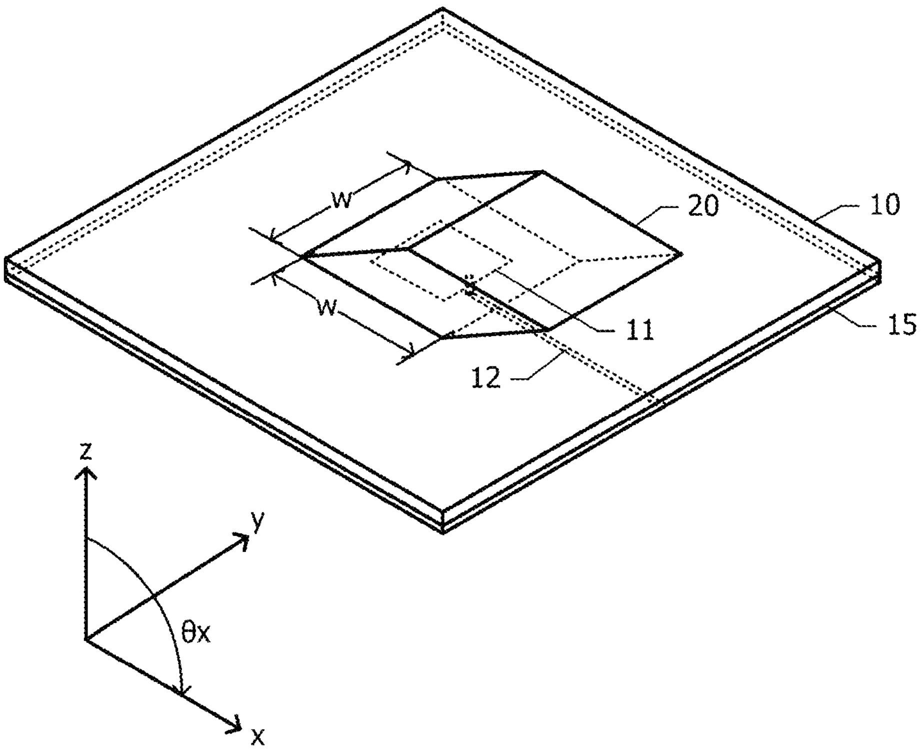
FIG. 1 is a perspective view of an antenna device according to a first embodiment.

FIG. 1 is a perspective view of the antenna device according to the first embodiment. A radiation element 11 is disposed on the top surface, which is one of the surfaces of a substrate 10 made of a dielectric material, while a ground conductor 15 is disposed on an inner layer of the substrate 10. In the embodiments discussed herein, either, or both, the radiation element(s) and the ground conductor(s) may be formed on or in (fully or partially) the dielectric material. In this first embodiment, the radiation element 11 and the ground conductor 15 form a patch antenna. The radiation element 11 has a square planar shape. A Cartesian coordinate system having xyz axes is defined as follows. The directions parallel with the top surface of the radiation element 11 and also parallel with two adjacent sides of the radiation element 11 are the x-axis direction and the y-axis direction. The direction of a normal line to the radiation element 11 is the z-axis direction. The direction of the normal line to the radiation element 11 is defined as the height direction. The radiation element 11 may have another planar shape, such as a rectangle or a circle.

A dielectric member 20 is disposed on the substrate 10 (on the side of the substrate 10 opposite the side on which the ground conductor 15 is disposed as viewed from the radiation element 11) so that it covers the radiation element 11 as viewed from above. While the term "dielectric member" is used as a term of convenience, the dielectric member 20 is a body of material have a dielectric property. The dielectric member 20 is bonded to the radiation element 11 and the substrate 10 with an adhesive, for example. A feed line 12 is provided on the bottom surface of the substrate 10. The feed line 12 is coupled with the radiation element 11 by means of a via-hole within a clearance hole formed in the ground conductor 15 and extends on the positive side of the x axis.

The dielectric member 20 has a bottom surface facing the substrate 10 and a top surface opposing the bottom surface. The bottom surface is a square, each side of which has a length W, parallel with the x-axis direction and the y-axis direction. The center of the bottom surface of the dielectric member 20 and that of the radiation element 11 coincide with each other. The bottom surface of the dielectric member 20 contains the radiation element 11 as viewed from above. The top surface of the dielectric member 20 is located at a position at which the x component and the z component of the bottom surface are moved by translation in positive x and z vector directions. The dielectric member 20 also has four side surfaces which connect the top surface and the bottom surface. That is, the dielectric member 20 is a parallelepiped. A line linking the centroids of horizontal sectional surfaces of the dielectric member 20 tilts toward the positive direction of the x axis from the z-axis direction. Among the four side surfaces of the dielectric member 20, two side surfaces are perpendicular to the y-axis direction, while the remaining two side surfaces tilt with respect to the xy face. Outward-pointing normal vectors of the two remaining two surfaces are perpendicular to the y-axis direction.

The dielectric member 20 may be made of ceramics, such as low-temperature co-fired ceramics (LTCC), or a resin, such as polyimide. The relative permittivity εr of LTCC is about 6.4, while that of polyimide is about 3.

Figure 2:
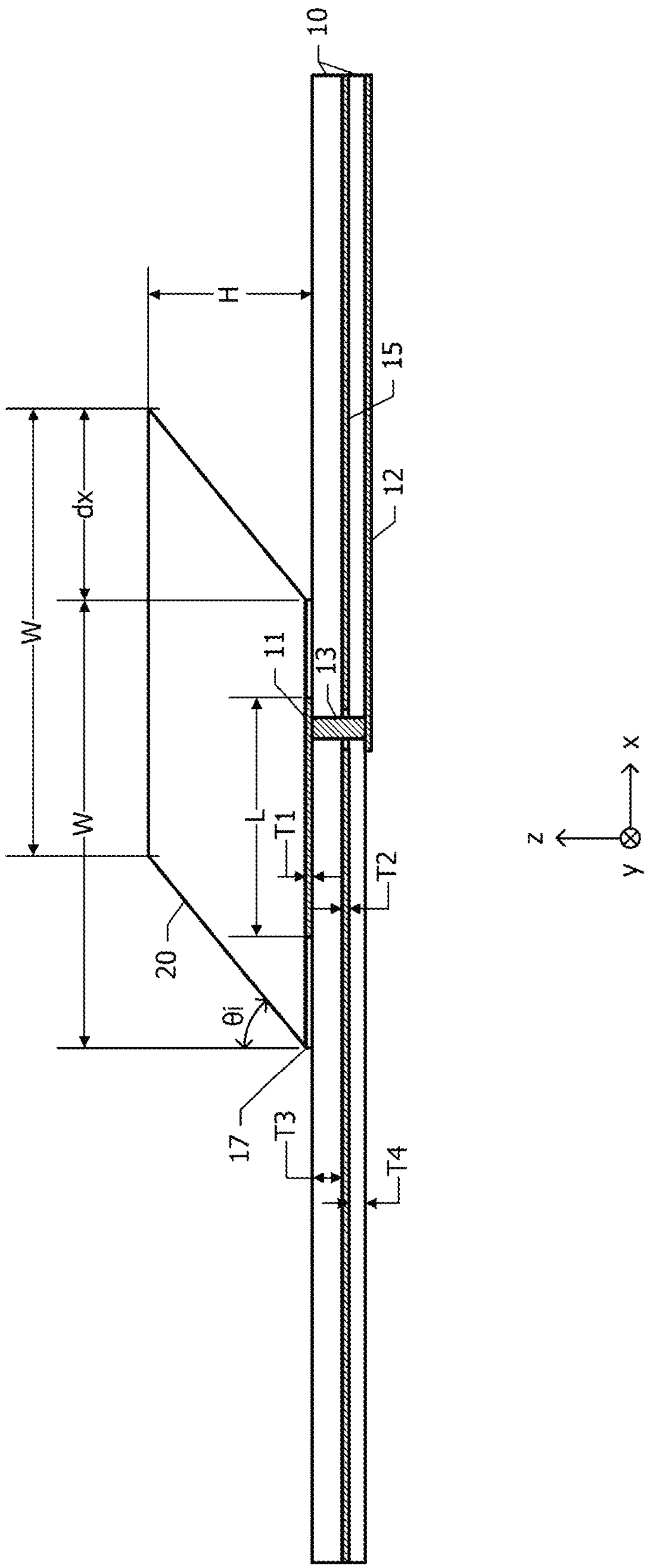
FIG. 2 is a sectional view of the antenna device of the first embodiment parallel with an xz face.

FIG. 2 is a sectional view of the antenna device of the first embodiment parallel with the xz face. The radiation element 11 is disposed on the top surface of the substrate 10. The ground conductor 15 is disposed on the inner surface of the substrate 10. The feed line 12 is disposed on the bottom surface of the substrate 10. The feed line 12 is coupled with the radiation element 11 by means of a via-conductor 13 passing through the clearance hole formed in the ground conductor 15. An adhesive layer 17 is disposed between the substrate 10 and the dielectric member 20.

The height of the dielectric member 20 is represented by H. An x component of a length from the center of the bottom surface to that of the top surface of the dielectric member 20 is designated by dx (hereinafter called the amount of horizontal displacement). The angle (tilt angle) between the oblique surface and the positive direction of the z axis is represented by Oi. The length of each side of the radiation element 11 is represented by L, while the thickness of the radiation element 11 is indicated by T1. The thickness of the ground conductor 15 is designated by T2. Regarding the substrate 10, T3 designates the thickness between the radiation element 11 and the ground conductor 15, while T4 indicates the thickness of the substrate 10 under the ground conductor 15.

Advantages of the first embodiment will be described below.

In the first embodiment, the dielectric member 20 disposed on the radiation element 11 tilts with respect to the substrate 10. Radio waves radiated from the radiation element 11 are more likely to propagate through a space having a relatively high permittivity. The permittivity of the dielectric member 20 is higher than that of the atmospheric air, and so radio waves radiated from the radiation element 11 thus tend to propagate toward the tilting direction of the dielectric member 20. As a result, the antenna gain in a direction leaning from the direction directly in front of the radiation element 11 can be made higher than that in this front direction of the radiation element 11.

To verify the above-described advantages, a simulation was conducted. In the simulation, the length of each side of the radiation element 11 was 0.8 mm. Three antenna devices including dielectric members 20 whose bottom surfaces had different lengths W and different heights H and whose horizontal displacement dx have different amounts were prepared. Regarding the three antenna devices, the relationship between the antenna gain and the tilt angle θx toward the x-axis positive direction from the direction of a normal line was determined.

Figure 3:
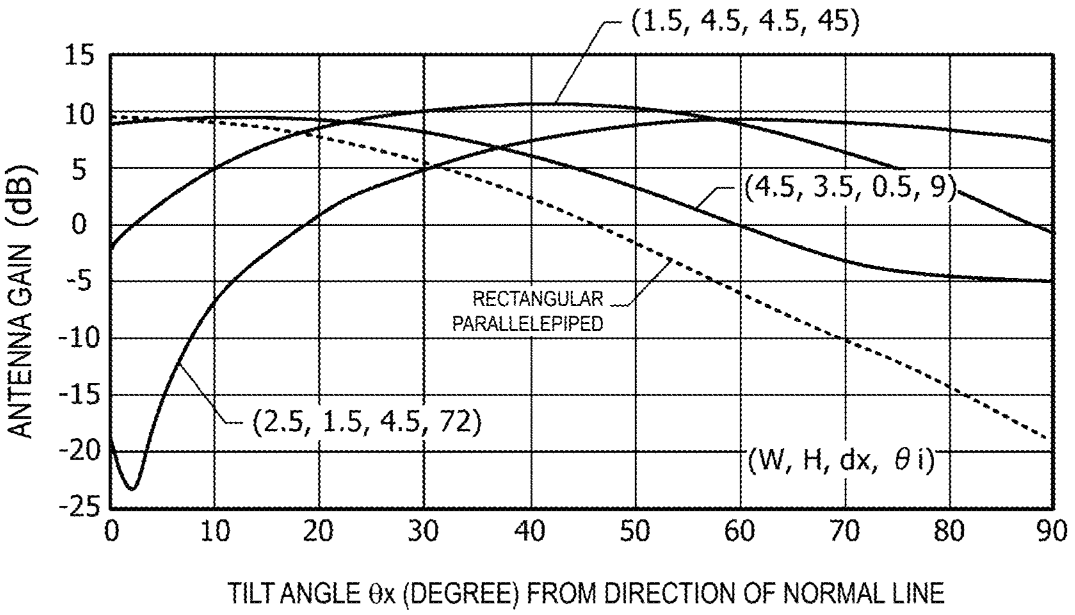
FIG. 3 is a graph illustrating the simulation results of the antenna gain of the antenna device according to the first embodiment.

FIG. 3 is a graph illustrating the simulation results. The horizontal axis indicates the tilt angle θx from the direction of a normal line by the unit "degree", while the vertical axis indicates the antenna gain by the unit "dB". The numeric values in parentheses appended to the solid lines in the graph in FIG. 3 refer to the length W of each side of the bottom surface, the height H, the amount of horizontal displacement dx, and the tilt angle θi of the dielectric member 20 sequentially from the left. The unit of the length W, the height H, and the amount of horizontal displacement dx is "mm". The unit of the tilt angle θi is "degree". As a reference, the antenna gain of an antenna device including a dielectric member 20 having a shape of a rectangular parallelepiped is indicated by the broken line. When the dielectric member 20 is a rectangular parallelepiped, the tilt angle θx is 0°, that is, the antenna gain in the direction directly in front of the radiation element 11 is maximized.

It is seen from the graph that the antenna gain is maximized in the direction of the dielectric member 20 directly in front of the radiation element 11. In contrast, the maximum gain for each of the two antennas having non-zero tilt angles θx occur at positive tilt angles. Moreover, the highest value of the antenna gain of each antenna device in the tilting direction of the dielectric member 20 is higher than that of the antenna device including a rectangular-parallelepiped dielectric member 20 in the same tilting direction. The tilt angle θx at which the antenna gain is maximized is substantially equal to the tilt angle θi of the oblique side surface of the dielectric member 20.

It is therefore validated from the simulation results shown in FIG. 3 that, as a result of tilting the dielectric member 20, the antenna gain in a direction leaning from the direction directly in front of the radiation element 11 can be increased.

Modified examples of the first embodiment will be described below. Although the bottom surface of the dielectric member 20 is a square in the first embodiment, it may have another quadrilateral shape, such as a rectangle having sides parallel with the x-axis direction and the y-axis direction. The bottom surface of the dielectric member 20 may have a shape of another polygon, a circle, or an ellipse, for example.

Second Embodiment

An antenna device according to a second embodiment will be described below with reference to FIGS. 4 through 6. An explanation of the elements configured in the same manner as the antenna device of the first embodiment (FIGS. 1 and 2) will be omitted.

Figure 4:
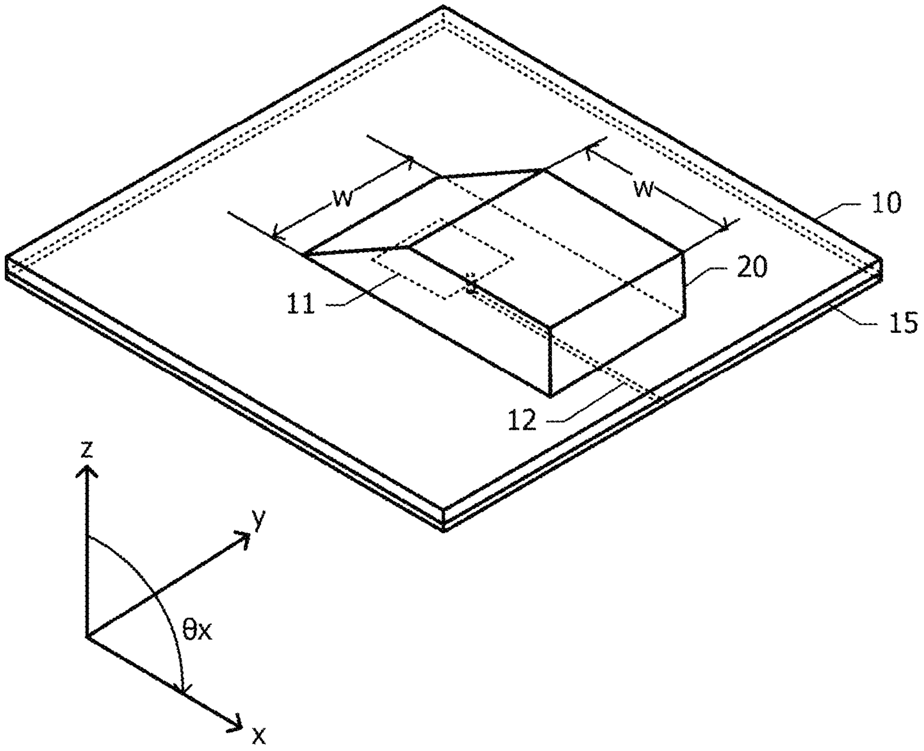
FIG. 4 is a perspective view of an antenna device according to a second embodiment.

FIG. 4 is a perspective view of the antenna device according to the second embodiment. In the first embodiment, an outward-pointing normal vector of one of the two tilting side surfaces faces upward (that is, the z-axis positive direction) from the direction parallel with the xy face, while an outward-pointing normal vector of the other tilting side surface faces downward (that is, the z-axis negative direction) from the direction parallel with the xy face. In the second embodiment, the side surface whose outward-pointing normal vector faces downward in the first embodiment is set to be perpendicular to the xy face. With this configuration, the two side surfaces perpendicular to the y-axis direction each have a trapezoidal shape whose one leg is perpendicular to the bottom surface.

The shape of the bottom surface of the dielectric member 20 is a rectangle and the short sides of the rectangle have a length W. The shape of the top surface of the dielectric member 20 is a square and each side of the square has a length W.

Figure 5:
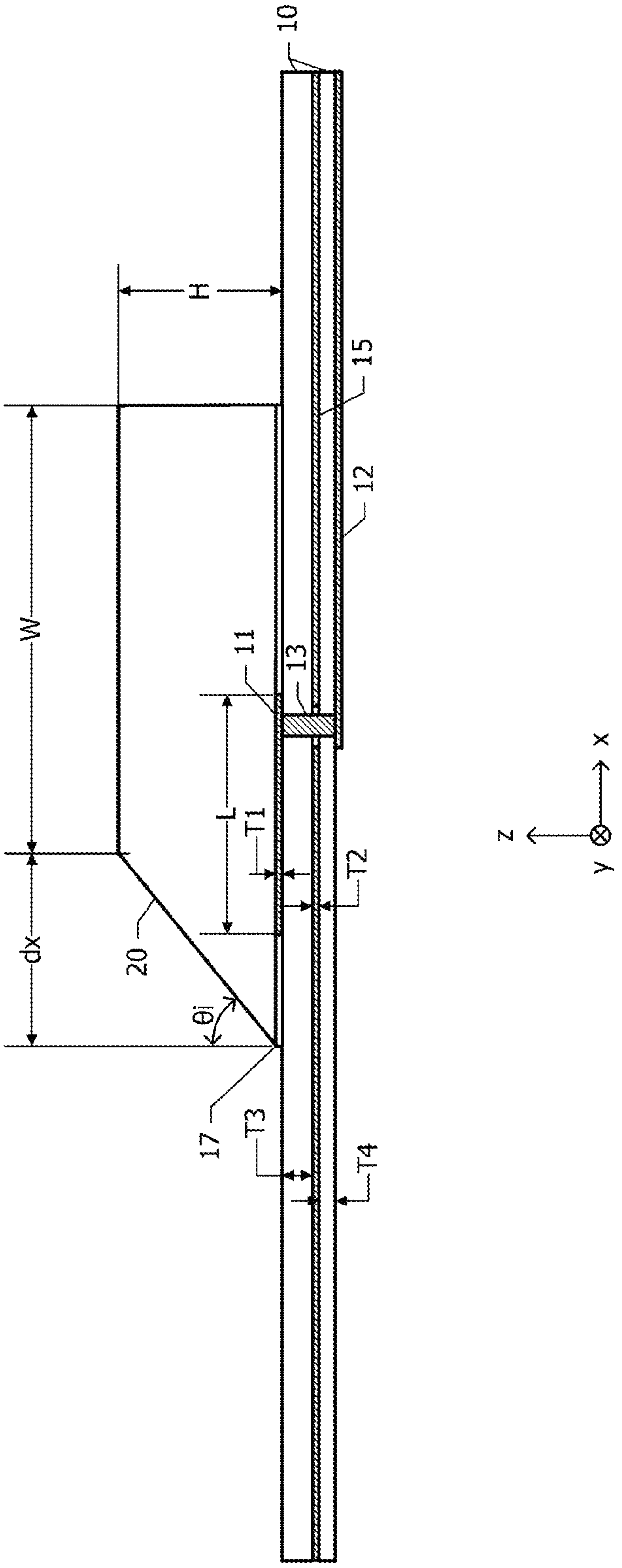
FIG. 5 is a sectional view of the antenna device of the second embodiment parallel with the xz face.

FIG. 5 is a sectional view of the antenna device of the second embodiment parallel with the xz face. A cross section of the dielectric member 20 parallel with the xz face has a trapezoidal shape whose one leg is perpendicular to the bottom surface. The dimension of the tilting side surface in the x-axis direction (the amount of horizontal displacement) is indicated by dx.

Advantages of the second embodiment will be described below.

In the second embodiment, the side surface of the dielectric member 20 facing in the positive direction of the x axis is perpendicular to the bottom surface, while the side surface facing in the negative direction of the x axis tilts with respect to the xy face as in the first embodiment. With this configuration, as viewed from the radiation element 11 in the upward direction (the positive direction of the z axis), the dielectric member 20 tilts toward the positive side of the x axis. It is thus possible to increase the antenna gain in a direction leaning from the direction directly in front of the radiation element 11, as in the first embodiment.

In the first embodiment, the dielectric member 20 has a portion protruding as in the shape of the eaves (the right end portion on the top surface in FIG. 2). In contrast, in the second embodiment, the dielectric member 20 does not have such a portion. The bottom surface of the dielectric member 20 in the second embodiment is larger than that in the first embodiment. This can enhance the mechanical stability and the mounting strength of the dielectric member 20 in the second embodiment.

To verify the advantages of the second embodiment, a simulation similar to that in the first embodiment was conducted.

Figure 6:
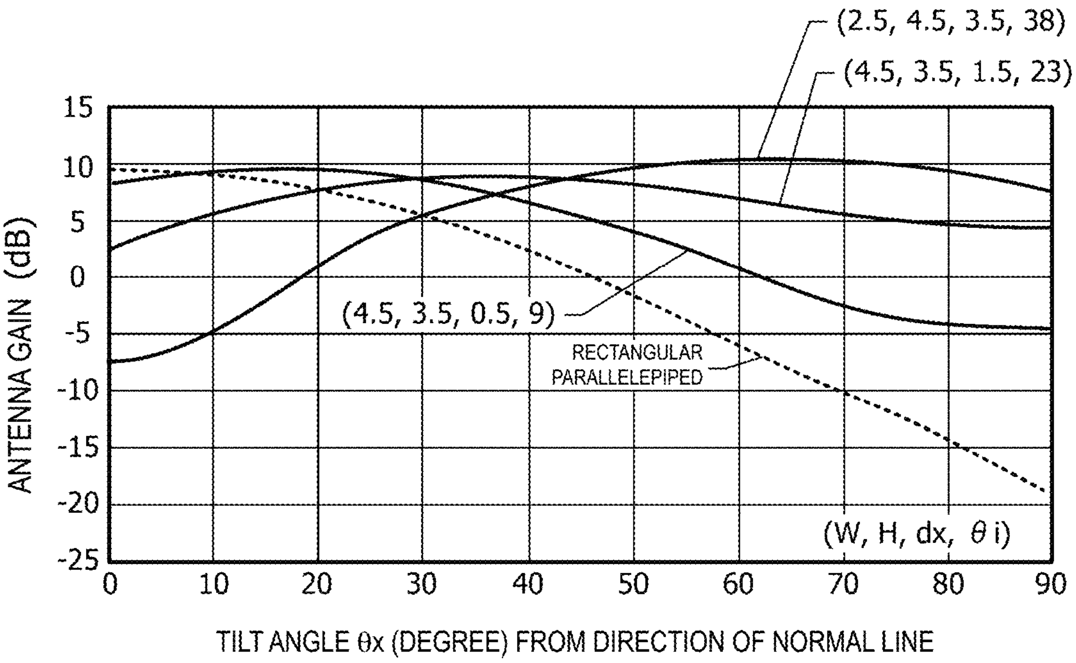
FIG. 6 is a graph illustrating the simulation results of the antenna gain of the antenna device according to the second embodiment.

FIG. 6 is a graph illustrating the simulation results of the antenna device of the second embodiment. The horizontal axis indicates the tilt angle θx from the direction of a normal line by the unit "degree", while the vertical axis indicates the antenna gain by the unit "dB". The numeric values in parentheses appended to the solid lines in the graph in FIG. 6 refer to the length W of the short sides of the bottom surface, the height H, the amount of horizontal displacement dx, and the tilt angle θi of the dielectric member 20 sequentially from the left. The unit of the length W, the height H, and the amount of horizontal displacement dx is "mm". The unit of the tilt angle θi is "degree". For the sake of reference, the antenna gain of an antenna device including a dielectric member 20 in the shape of a rectangular parallelepiped is indicated by the broken line. When the dielectric member 20 is formed in a rectangular parallelepiped, the tilt angle θx is 0°, that is, the antenna gain in the direction directly in front of the radiation element 11 is maximized.

In the second embodiment, too, it is verified that the antenna gain is maximized in a direction leaning from the direction directly in front of the radiation element 11. As the tilt angle θi of the side surface becomes greater, the tilt angle θx at which the antenna gain is maximized also becomes greater.

Third Embodiment

An antenna device according to a third embodiment will now be described below with reference to FIGS. 7A and 7B. An explanation of the elements configured in the same manner as the antenna device of the first embodiment (FIGS. 1 and 2) or the antenna device of the second embodiment (FIGS. 4 and 5) will be omitted.

Figure 7A:
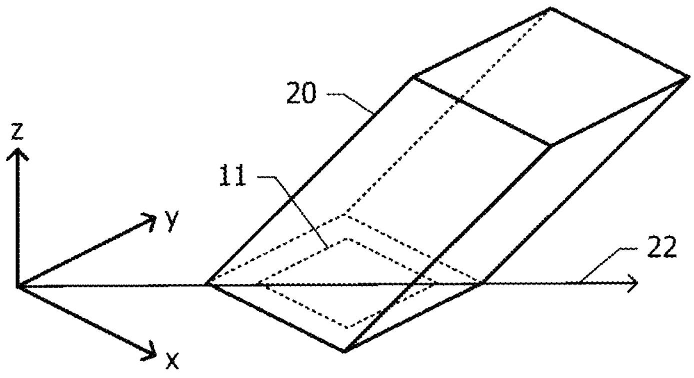
FIGS. 7A and 7B are respectively a perspective view of a dielectric member of an antenna device according to a third embodiment and that according to a modified example of the third embodiment.

FIG. 7A is a perspective view of a dielectric member 20 of the antenna device according to the third embodiment. In the first embodiment, the dielectric member 20 (FIG. 1) tilts in the positive direction of the x axis. In contrast, in the third embodiment, an orientation of tilt 22 of the dielectric member 20 deviates from the positive direction of the x axis. The angle between the orientation of tilt 22 and the positive direction of the x axis is 45°, for example. With this configuration, none of the four side surfaces are perpendicular to the xy face. Outward-pointing normal vectors of two side surfaces face in the positive direction of the z axis (upward) from the direction parallel with the xy face. Outward-pointing normal vectors of the remaining two side surfaces face in the negative direction of the z axis (downward) from the direction parallel with the xy face.

In the third embodiment, too, when the direction of a normal line to the radiation element 11 (z-axis direction) is assumed as the height direction, a line linking the centroids of horizontal sectional surfaces of the dielectric member 20 in the height direction leans with respect to the direction of the normal line to the radiation element 11. With this configuration, as in the first and second embodiments, the antenna gain is maximized in a direction leaning from the direction directly in front of the radiation element 11. As a result of changing the orientation of tilt 22, the direction in which the antenna gain is maximized can be adjusted as desired.

Figure 7B:
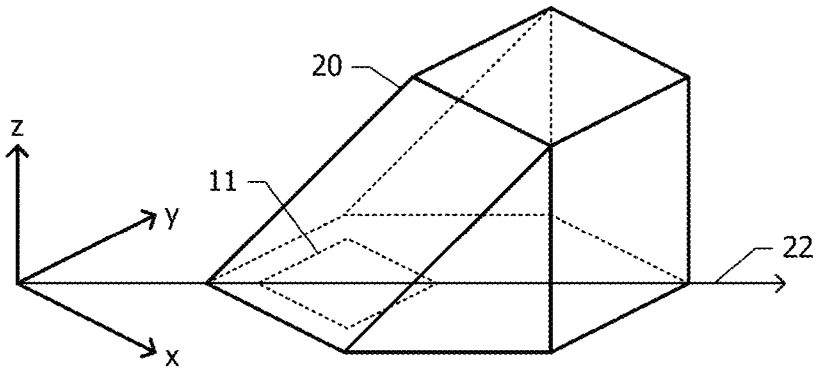

FIG. 7B is a perspective view of a dielectric member 20 of an antenna device according to a modified example of the third embodiment. In the modified example, as well as in the third embodiment (FIG. 7A), the orientation of tilt 22 deviates from the positive direction of the x axis. In the modified example, among the side surfaces of the dielectric member 20 in the third embodiment, the two side surfaces whose outward-pointing normal vectors face downward are set to be perpendicular to the xy face. The bottom surface of the dielectric member 20 is a hexagon. The dielectric member 20 has six side surfaces, two of which are parallel with the orientation of tilt 22 and are in the shape of a right triangle.

In this modified example, too, when the direction of a normal line to the radiation element 11 (z-axis direction) is assumed as the height direction, a line linking the centroids of horizontal sectional surfaces of the dielectric member 20 in the height direction leans with respect to the direction of the normal line to the radiation element 11. With this configuration, as in the third embodiment, the antenna gain is maximized in a direction leaning from the direction directly in front of the radiation element 11. As a result of changing the orientation of tilt 22, the direction in which the antenna gain is maximized can be adjusted as desired.

Fourth Embodiment

An antenna device according to a fourth embodiment will now be described below with reference to FIGS. 8 through 10B. An explanation of the elements configured in the same manner as the antenna devices of the first through third embodiments will be omitted.

Figure 8:
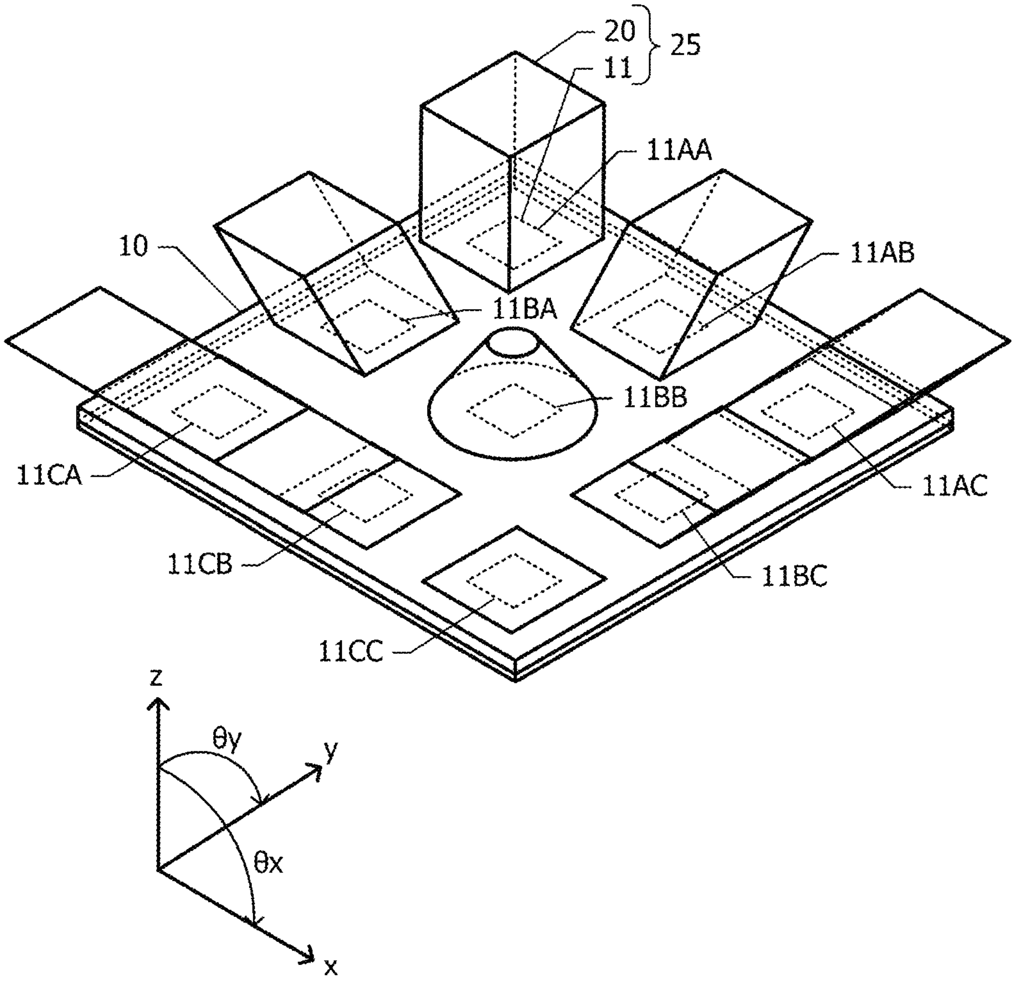
FIG. 8 is a perspective view of an antenna device according to a fourth embodiment.
Figure 9:
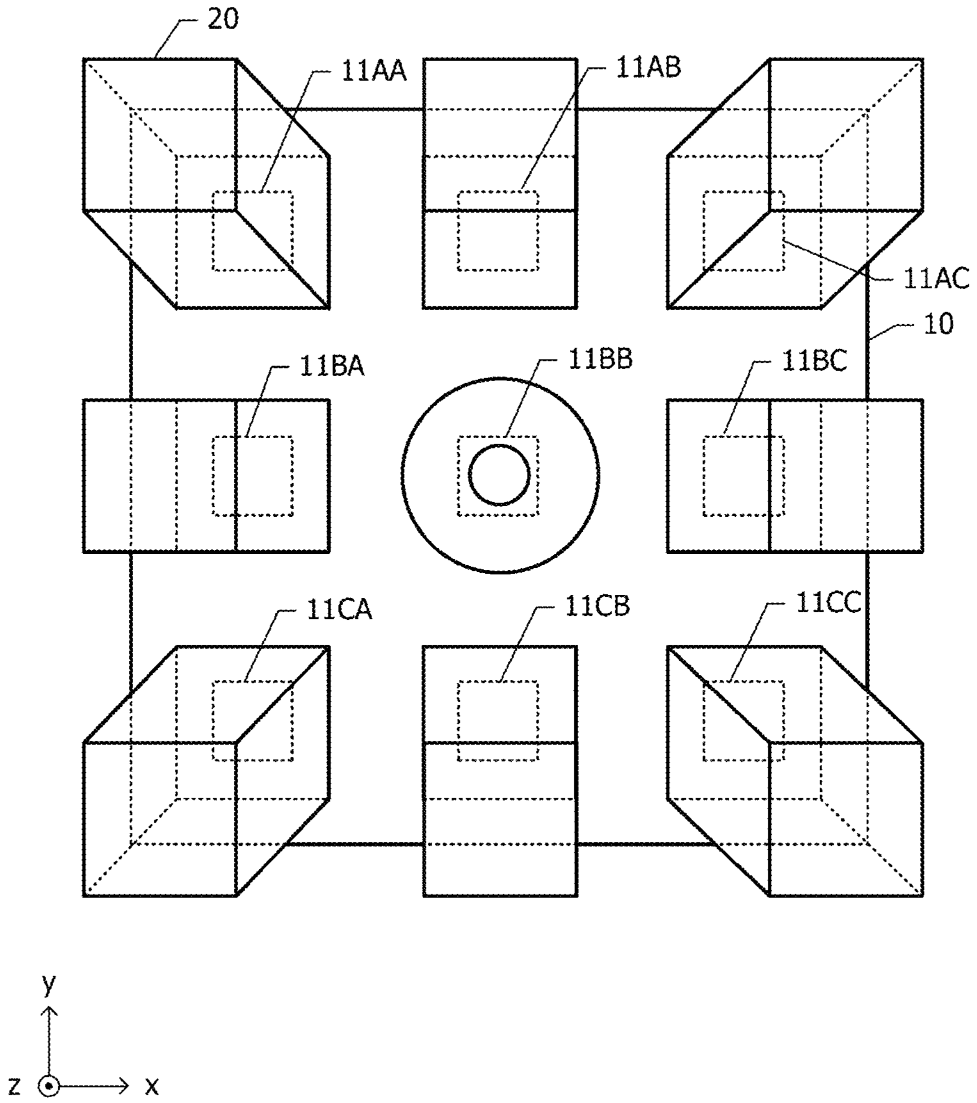
FIG. 9 is a plan view of the antenna device according to the fourth embodiment.

FIGS. 8 and 9 are respectively a perspective view and a plan view of the antenna device according to the fourth embodiment. In the fourth embodiment, nine radiation elements 11 are disposed in a matrix of three rows and three columns. The row direction is parallel with the x-axis direction, while the column direction is parallel with the y-axis direction. A dielectric member 20 is disposed in association with each of the nine radiation elements 11. One radiation element 11 and one dielectric member 20 form one element unit 25, and plural element units 25 are disposed on the substrate 10 so as to form an array antenna.

The dielectric member 20 associated with the radiation element 11BB at the center has a truncated conical shape. The dielectric members 20 associated with the eight surrounding radiation elements 11 tilt in the directions of imaginary lines radially extending from the centroid of the array antenna (the center of the central radiation element 11). This will be explained more specifically. The dielectric members 20 for the two radiation elements 11BC and 11BA respectively located on the positive side and the negative side of the x axis with respect to the central radiation element 11BB respectively tilt in the positive direction and the negative direction of the x axis. The dielectric members 20 for the two radiation elements 11AB and 11CB respectively located on the positive side and the negative side of the y axis with respect to the central radiation element 11 respectively tilt in the positive direction and the negative direction of the y axis. The shapes of the dielectric members 20 associated with the radiation elements 11AB, 11BA, 11BC, and 11CB are the same as that of the dielectric member 20 of the first embodiment (FIGS. 1 and 2).

The dielectric member 20 for the radiation element AC positioned at an angle of 45° in the positive direction of the x axis and in the positive direction of the y axis with respect to the central radiation element 11 tilts at an angle of 45° in the positive direction of the x axis and in the positive direction of the y axis. Among the nine radiation elements 11 disposed in a matrix of three rows and three columns, the dielectric members 20 associated with the three radiation elements 11AA, 11CA, 11CC located at the other corners tilt in a manner similar to the dielectric member 20 associated with the radiation element AC. The shapes of the dielectric members 20 for the radiation elements 11AA, 11AC, 11CA, and 11CC are the same as that of the dielectric member 20 of the third embodiment (FIG. 7A).

Regarding each of the dielectric members 20 other than the dielectric member 20 associated with the central radiation element 11, a line linking the centroids of horizontal sectional surfaces of such a dielectric member 20 in the height direction tilts outward (away from a direction normal to a main surface of the substrate) as viewed from the centroid of the array antenna.

Advantages of the fourth embodiment will be described below. In the fourth embodiment, when focusing on each element unit 25, it is seen that the direction in which the antenna gain is maximized leans to radiate outwardly with respect to the direction directly in front of the radiation element 11. A high antenna gain can thus be obtained in a wider range of directions leaning from the directions directly in front of the respective radiation elements 11.

A simulation was conducted to verify the above-described advantages and will be discussed below. In the simulation, the length of each side of the radiation element 11 was 0.8 mm. The center-to-center distance between the radiation elements 11 in the x-axis direction and in the y-axis direction was 2.5 mm. Regarding the dielectric member 20 associated with the central radiation element 11BB, the diameter of the bottom surface was 2 mm, the diameter of the top surface was 0.6 mm, and the height was 1 mm. The dimension of the bottom surface of each of the eight surrounding dielectric members 20 in the x-axis direction was 1.6 mm, while that in the y-axis direction was 1.5 mm. The amount of horizontal displacement of the dielectric members 20 associated with the radiation elements 11AB, 11BA, 11BC, and 11CB was 1 mm. The amount of horizontal displacement of the dielectric members 20 associated with the radiation elements 11AA, 11AC, 11CA, and 11CC in the x-axis direction and that in the y-axis direction were both 1 mm.

Figure 10A:
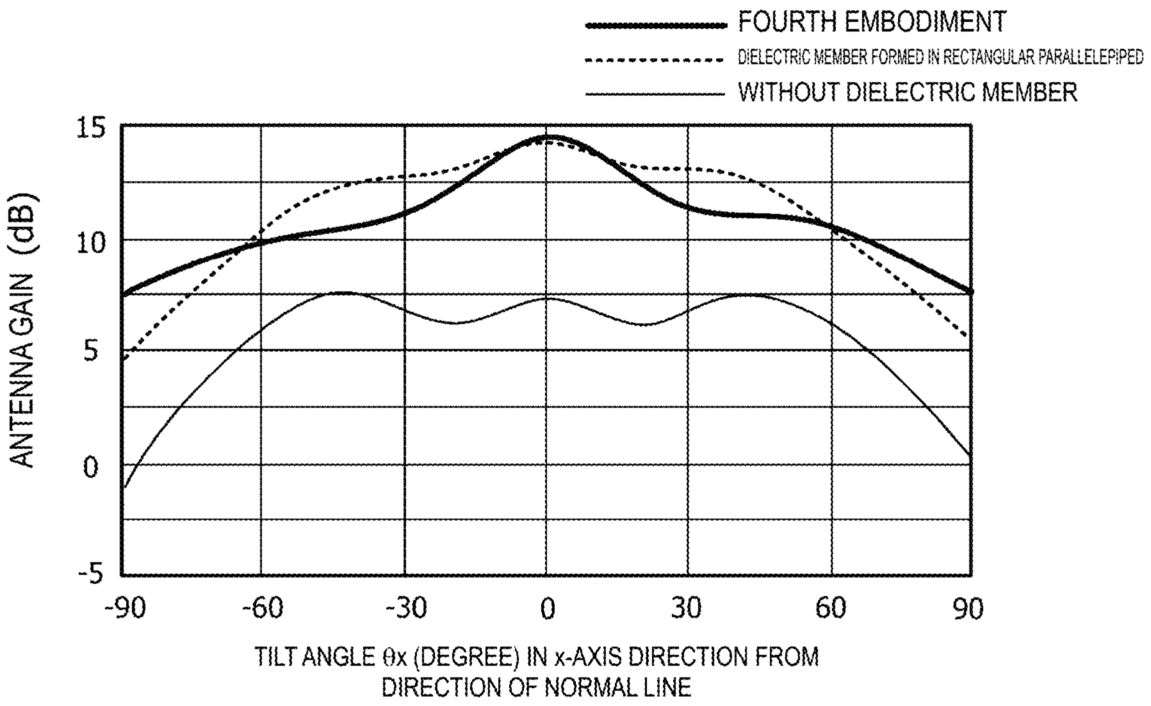
FIGS. 10A and 10B are graphs illustrating the simulation results regarding the dependence of the antenna gain of the antenna device according to the fourth embodiment on a tilt angle in the xz plane and that in the yz plane, respectively.
Figure 10B:
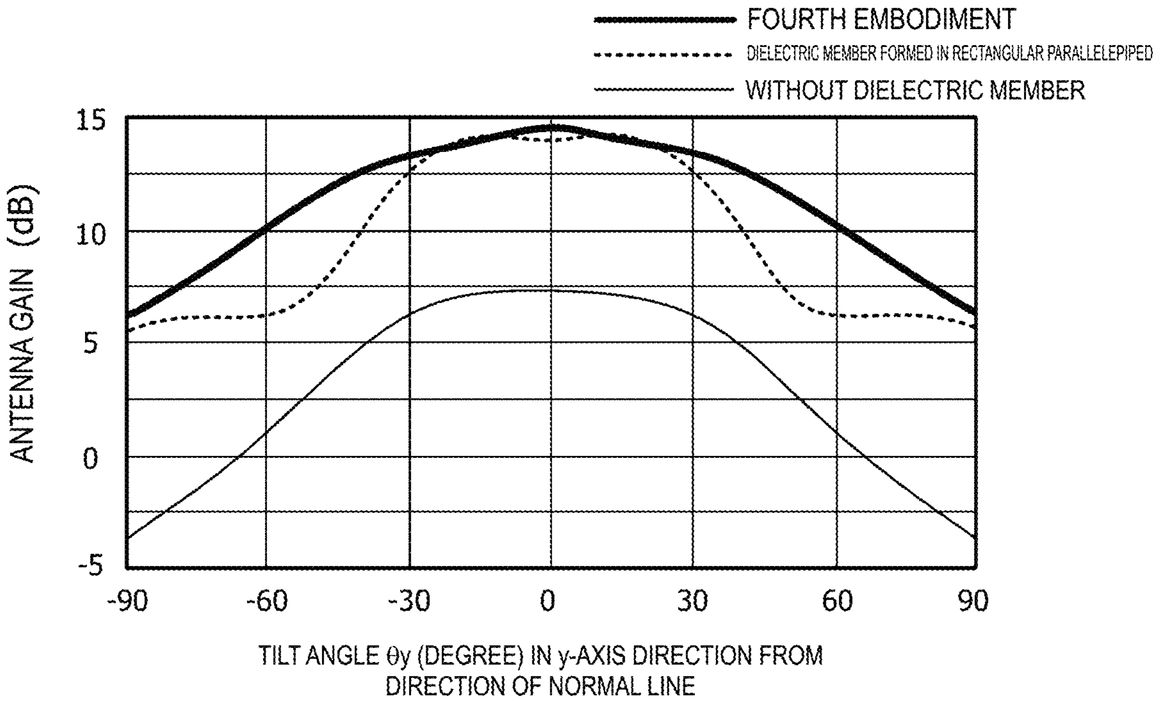

FIGS. 10A and 10B are graphs illustrating the simulation results regarding the dependence of the antenna gain on the tilt angle in the xz plane and that in the yz plane, respectively. The horizontal axes in FIGS. 10A and 10B respectively represent the tilt angle θx in the x-axis direction and the tilt angle θy in the y-axis direction with respect to the direction of a normal line. The vertical axes in FIGS. 10A and 10B represent the antenna gain by the unit "dB". The thick solid lines in the graphs of FIGS. 10A and 10B indicate the antenna gain of the antenna device of the fourth embodiment. For the sake of reference, the antenna gain of an antenna device including a dielectric member 20 formed in a rectangular parallelepiped is indicated by the broken lines, and the antenna gain of an antenna device without any dielectric member 20 is indicated by the thin solid lines.

In the fourth embodiment, in comparison with the antenna device without any dielectric member 20, not only the antenna gain in the direction directly in front of the radiation element 11, but also the antenna gain in the directions leaning from the direction directly in front of the radiation element 11 is increased. It is thus validated from the simulation results that, as a result of disposing the dielectric members 20 as in the antenna device of the fourth embodiment, the antenna gain in the direction directly in front of the radiation element 11 and also in directions leaning from this front direction of the radiation element 11 can be increased.

In the ranges in which the absolute value of the tilt angle θx in the x-axis direction is larger than about 60° and that of the tilt angle θy in the y-axis direction is larger than about 30°, the gain of the antenna device of the fourth embodiment becomes higher than that of the antenna device including a dielectric member 20 formed in a rectangular parallelepiped. In this manner, the antenna gain can be increased in a range in which the side surface of the dielectric member 20 tilts with respect to the direction of a normal line by a larger angle.

Modified examples of the fourth embodiment will be discussed below.

In the fourth embodiment, the nine element units 25 (FIG. 8) are disposed in a matrix of three rows and three columns. The number of element units 25 may be other than nine. Plural element units 25 may be disposed in a matrix. For example, twelve element units 25 may be disposed in a matrix of three rows and four columns, or sixteen element units 25 may be disposed in a matrix of four rows and four columns. The element units 25 may not necessarily be arranged in a matrix. Plural element units 25 may be arranged at positions corresponding to the lattice points of a triangular lattice.

Fifth Embodiment

An antenna device according to a fifth embodiment will be described below with reference to FIG. 11. An explanation of the elements configured in the same manner as the antenna device of the second embodiment (FIGS. 4 and 5) will be omitted.

Figure 11:
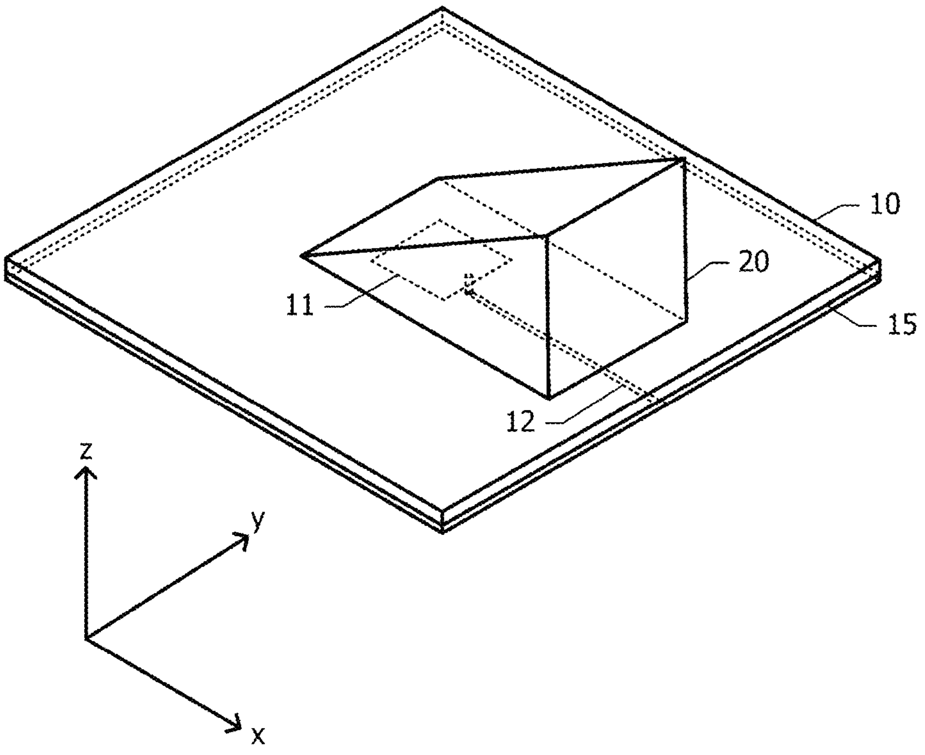
FIG. 11 is a perspective view of an antenna device according to a fifth embodiment.

FIG. 11 is a perspective view of the antenna device according to the fifth embodiment. A cross section of the dielectric member 20 of the antenna device according to the fourth embodiment parallel with the xz face is a trapezoid. In the fifth embodiment, a cross section of the dielectric member 20 parallel with the xz face is a right triangle. One of the two sides of the right triangle forming a right angle corresponds to an edge of the bottom surface, while the other side corresponds to the side surface perpendicular to the xy face. The hypotenuse of the right triangle corresponds to the side surface tilting from the xy face.

In the fifth embodiment, too, when the direction of a normal line to the radiation element 11 is assumed as the height direction, a line linking the centroids of horizontal sectional surfaces of the dielectric member 20 in the height direction leans with respect to the direction of the normal line to the radiation element 11. With this configuration, as in the first and second embodiments, a high antenna gain can be obtained in a direction leaning from the direction directly in front of the radiation element 11.

Sixth Embodiment

An antenna device according to a sixth embodiment will be described below with reference to FIG. 12A. An explanation of the elements configured in the same manner as the antenna device of the first embodiment (FIGS. 1 and 2) will be omitted.

Figure 12A:
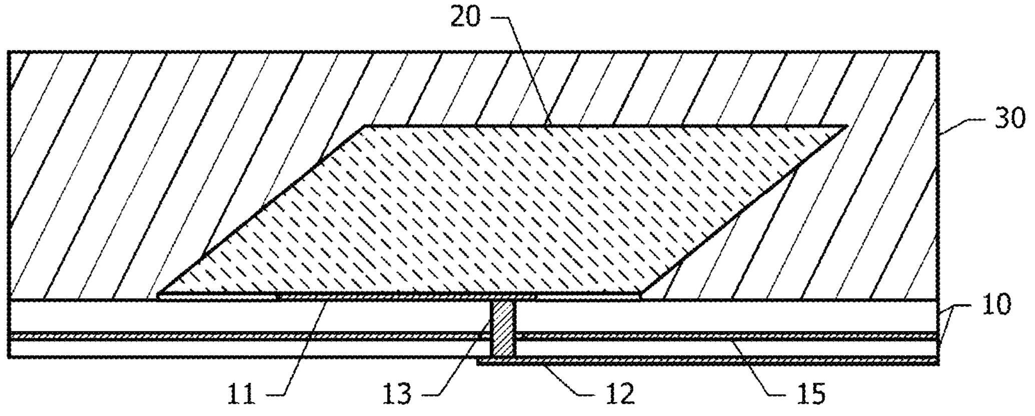
FIGS. 12A and 12B are respectively a sectional view of an antenna device according to a sixth embodiment and that according to a modified example of the sixth embodiment.

FIG. 12A is a sectional view of the antenna device according to the sixth embodiment. The dielectric member 20 of the antenna device of the first embodiment (FIGS. 1 and 2) is exposed to the atmospheric air. In contrast, in the antenna device of the sixth embodiment, the dielectric member 20 is sealed with a sealing resin 30. The sealing resin 30 is also referred to as an encapsulating resin, or a body of resin material. In either case, the resin material itself may only seal, or encapsulate, those portions of the dielectric resin that are otherwise exposed, and not in contact with the radiation element and/or substrate. The permittivity of the sealing resin 30 is lower than that of the dielectric member 20. Other antenna structures for the other disclosed embodiments may similarly be modified by covering exposed surfaces of the respective dielectric members with a 3-D structure of the body of resin material.

Advantages of the sixth embodiment will be described below. Since the permittivity of the dielectric member 20 is higher than that of the surrounding sealing resin 30, radio waves radiated from the radiation element 11 propagate toward the tilting direction of the dielectric member 20. Hence, as in the first embodiment, the antenna gain in a direction leaning from the direction directly in front of the radiation element 11 can be made higher than that in this front direction of the radiation element 11. Additionally, because of the sealing resin 30 sealing the dielectric member 20, damage to the dielectric member 20 due to the falling off from the antenna device, for example, can be reduced.

A modified example of the sixth embodiment will be discussed below with reference to FIG. 12B.

Figure 12B:
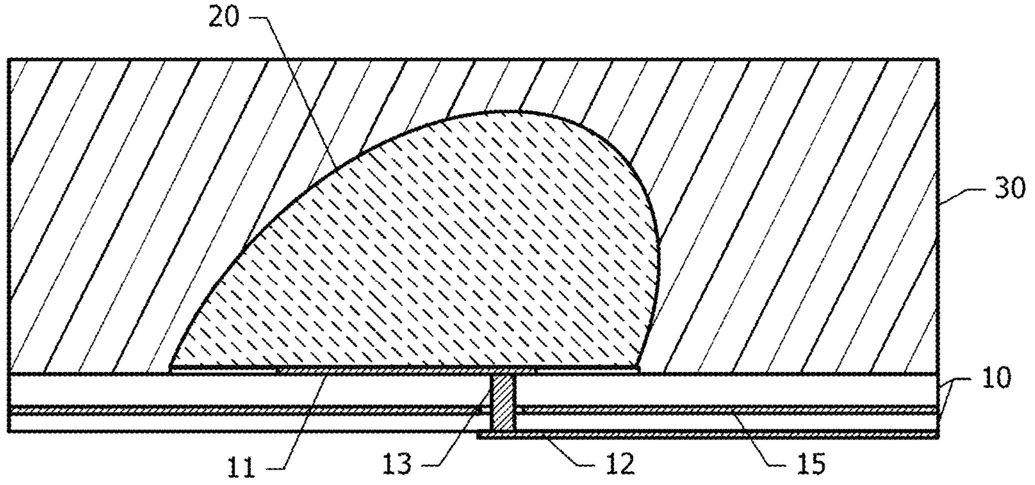

FIG. 12B is a sectional view of an antenna device according to a modified example of the sixth embodiment. The shape of the dielectric member 20 of the antenna device according to the sixth embodiment is a parallelepiped. The dielectric member 20 of the antenna device according to the modified example shown in FIG. 12B has the following shape, for example. A spheroid generated by rotating an ellipse with respect to its major axis is obliquely bisected with respect to its major axis. The resulting shape is the shape of the dielectric member 20, and the cutting face of the spheroid corresponds to the bottom surface of the dielectric member 20.

In this modified example, a line linking the centroids of horizontal sectional surfaces of the dielectric member 20 in the height direction leans with respect to the direction of a normal line to the radiation element 11. With this configuration, as in the sixth embodiment, the antenna gain in a direction leaning from the direction directly in front of the radiation element 11 can be made higher than that in this front direction of the radiation element 11. The shape of the dielectric member 20 may not necessarily be part of a geometrically precise spheroid. The surface other than the bottom surface may be a desired curved face.

Seventh Embodiment

An antenna device according to a seventh embodiment will be described below with reference to FIG. 13A. An explanation of the elements configured in the same manner as the antenna device of the first embodiment (FIGS. 1 and 2) will be omitted.

Figure 13A:
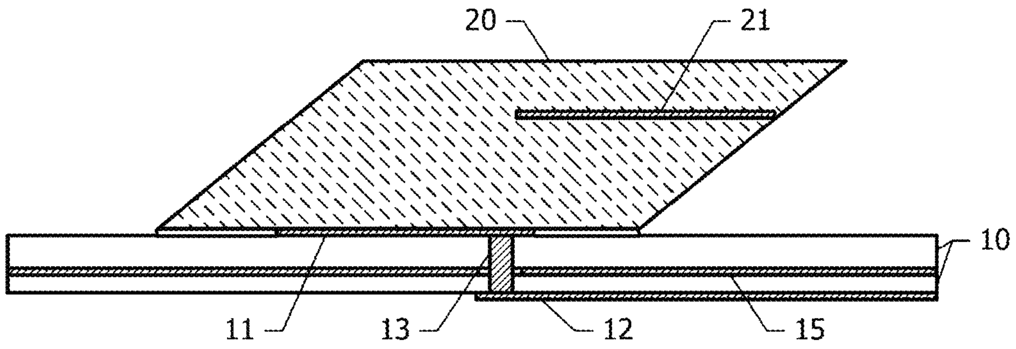
FIGS. 13A and 13B are respectively a sectional view of an antenna device according to a seventh embodiment and that according to a modified example of the seventh embodiment.

FIG. 13A is a sectional view of the antenna device according to the seventh embodiment. In the antenna device of the seventh embodiment, a parasitic element 21 is disposed in the dielectric member 20 formed in the same shape as that of the antenna device of the first embodiment (FIGS. 1 and 2). The parasitic element 21 is constituted by a conductive plate disposed in parallel with the radiation element 11. As viewed from above, the parasitic element 21 is located at a position displaced from the radiation element 11 toward the tilting direction of the dielectric member 20. The parasitic element 21 is coupled with the radiation element 11 so as to generate multi-resonance.

Advantages of the seventh embodiment will be discussed below. In the seventh embodiment, because of multi-resonance generated by the radiation element 11 and the parasitic element 21, the operating bandwidth of the antenna device is increased. Additionally, the parasitic element 21 is disposed at a position displaced from the radiation element 11 toward the tilting direction of the dielectric member 20. This enhances the effect of causing the antenna gain in a direction leaning from the direction directly in front of the radiation element 11 to be higher than that in this front direction of the radiation element 11.

Modified examples of the seventh embodiment will now be explained below with reference to FIGS. 13B through 14B.

Figure 13B:
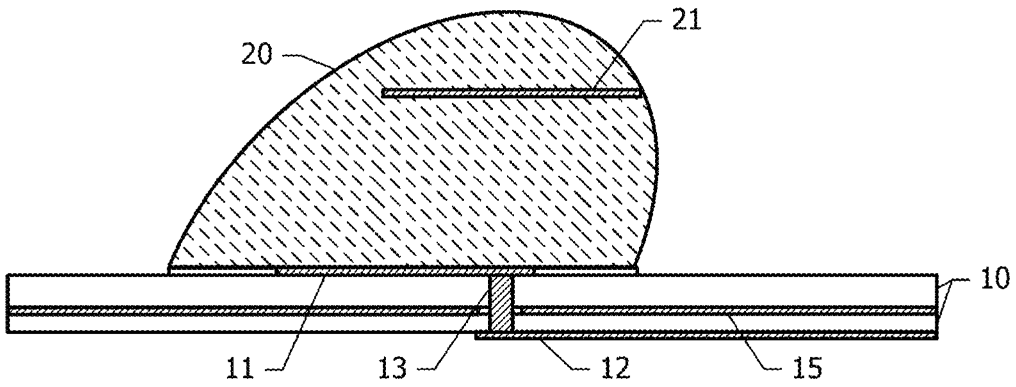

FIG. 13B is a sectional view of an antenna device according to a modified example of the seventh embodiment. In this modified example, the dielectric member 20 formed in the same shape as that of the antenna device according to the modified example of the sixth embodiment (FIG. 12B) is used. As in this modified example, a parasitic element 21 may be disposed in a dielectric member 20 constituted by a bottom surface and a desired curved surface.

Figure 14A:
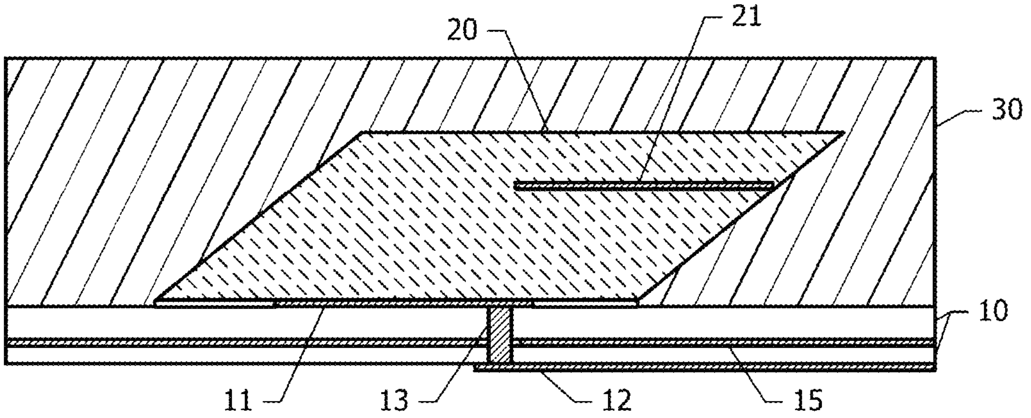
FIGS. 14A and 14B are sectional views of antenna devices according to other modified examples of the seventh embodiment.
Figure 14B:
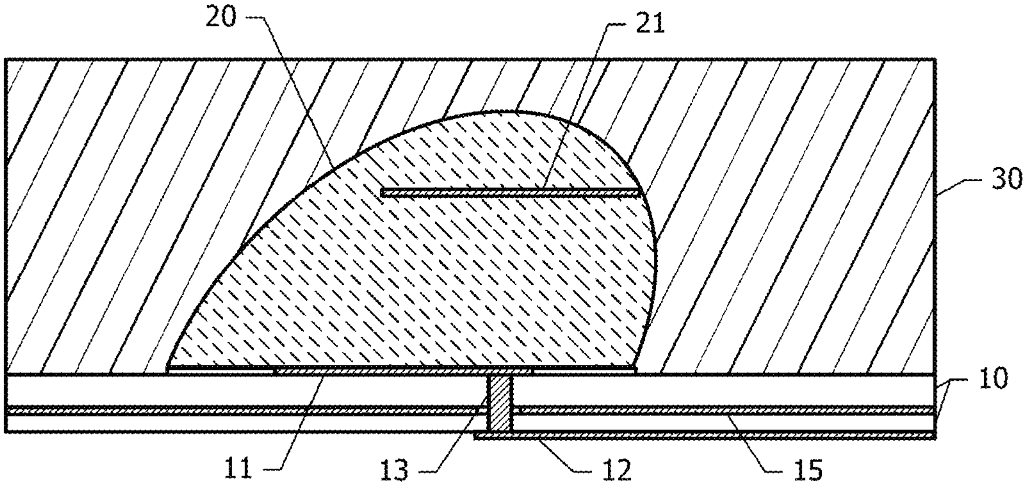

FIG. 14A is a sectional view of an antenna device according to another modified example of the seventh embodiment. In this modified example, the dielectric member 20 of the antenna device according to the seventh embodiment shown in FIG. 13A is sealed with a sealing resin 30. FIG. 14B is a sectional view of an antenna device according to still another modified example of the seventh embodiment. In this modified example, the dielectric member 20 of the antenna device according to the modified example of the seventh embodiment shown in FIG. 13B is sealed with a sealing resin 30. The permittivity of the sealing resin 30 is lower than that of the dielectric member 20, as in the sixth embodiment (FIG. 12A). As in the modified examples shown in FIGS. 14A and 14B, a dielectric member 20 integrating a parasitic element 21 therein may be sealed with a sealing resin 30.

Eighth Embodiment

A communication apparatus according to an eighth embodiment will be described below with reference to FIG. 15A. An explanation of the elements configured in the same manner as the antenna device of the first embodiment (FIGS. 1 and 2) will be omitted.

Figure 15A:
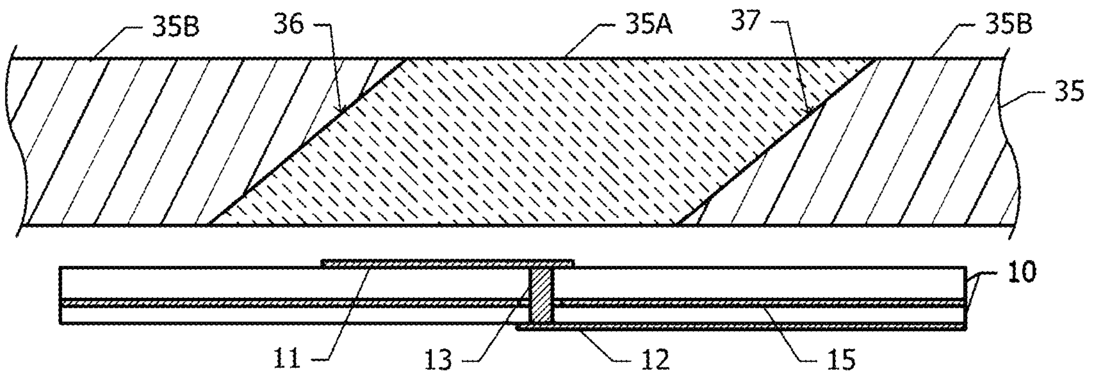
FIG. 15A is a partial sectional view of a communication apparatus according to an eighth embodiment.

FIG. 15A is a partial sectional view of the communication apparatus according to the eighth embodiment. In the antenna device of the first embodiment, the dielectric member 20 is fixed to the radiation element 11 and the substrate 10 via an adhesive, for example. In the eighth embodiment, the dielectric member 20 fixed to the radiation element 11 and the substrate 10 is not provided, and part of a housing 35 for storing the antenna device functions similarly to the dielectric member 20. The antenna device stored in the housing 35 is equivalent to the antenna device of the first embodiment (FIGS. 1 and 2) from which the dielectric member 20 is removed.

The housing 35 includes a high permittivity portion 35A having a relatively high permittivity and low permittivity portions 35B having a relatively low permittivity. The high permittivity portion 35A and the low permittivity portions 35B are separated from each other in the in-plane direction of the top surface of the radiation element 11. The high permittivity portion 35A is disposed at a position at which it covers the radiation element 11 as viewed from above. The antenna device is positioned and fixed in the housing 35 so that the high permittivity portion 35A is disposed over the radiation element 11 with a gap therebetween. The antenna device may be positioned in the housing 35 so that the high permittivity portion 35A contacts the radiation element 11. As discussed with other embodiments, a resin body may optionally be included on one or more exposed surfaces of the high permittivity portion 35A.

The high permittivity portion 35A is sandwiched between the two low permittivity portions 35B. Boundary surfaces 36 and 37 separating the high permittivity portion 35A and the low permittivity portions 35B from each other are parallel with each other and tilt with respect to the top surface of the radiation element 11. The boundary surface 36 overlaps an edge of the radiation element 11 as viewed from above. As viewed from above, the boundary surface 36 tilts so as to enter the inside of the radiation element 11 from the outside of the radiation element 11 as it separates from the radiation element 11 toward the direction of a normal line to the radiation element 11. The high permittivity portion 35A is positioned toward the radiation element 11 from the boundary surface 36. The other boundary surface 37 is positioned outside the radiation element 11 as viewed from above.

Advantages of the eighth embodiment will be discussed below.

In the eighth embodiment, the high permittivity portion 35A, which is part of the housing 35, functions similarly to the dielectric member 20 of the antenna device of the first embodiment. Hence, in the eighth embodiment, as well as in the first embodiment, the antenna gain in a direction leaning from the direction directly in front of the radiation element 11 can be made higher than that in this front direction of the radiation element 11.

In the eighth embodiment, an antenna device having typical directivity characteristics is used, and desired directivity characteristics of a communication apparatus can be implemented by adjusting the size and the shape of the high permittivity portion 35A of the housing 35 for storing the antenna device and also by adjusting the positional relationship between the high permittivity portion 35A and the radiation element 11.

Modified examples of the eighth embodiment will be explained below with reference to FIGS. 15B and 15C.

Figure 15B:
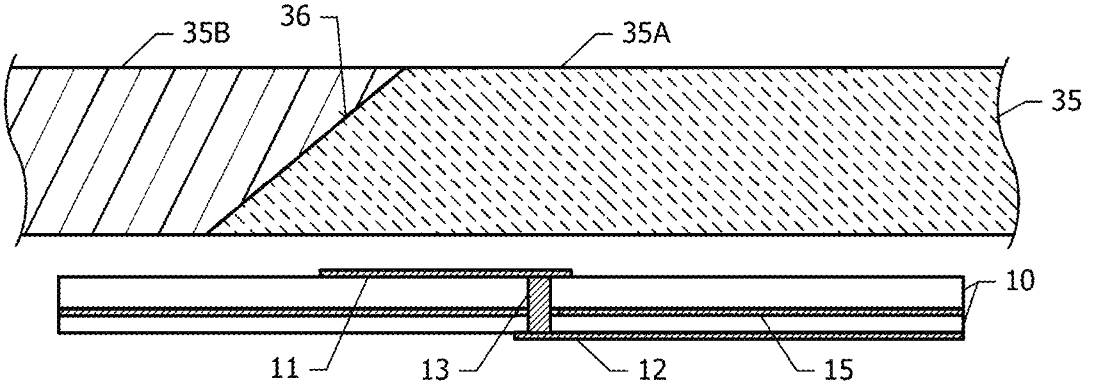
FIGS. 15B and 15C are partial sectional views of communication apparatuses according to modified examples of the eighth embodiment.

FIG. 15B is a partial sectional view of a communication apparatus according to a modified example of the eighth embodiment. In the eighth embodiment, the high permittivity portion 35A is sandwiched between the two low permittivity portions 35B. In contrast, in this modified example, the high permittivity portion 35A and the low permittivity portion 35B are separated from each other by the single boundary surface 36, and the boundary surface 37 in the communication apparatus of the eighth embodiment (FIG. 15A) is not used. The positional relationship between the boundary surface 36 and the radiation element 11 is the same as that of the antenna device of the eighth embodiment (FIG. 15A). The boundary surface 36 functions similarly to the tilting side surface of the dielectric member 20 of the antenna device according to the second embodiment (FIGS. 4 and 5).

Figure 15C:
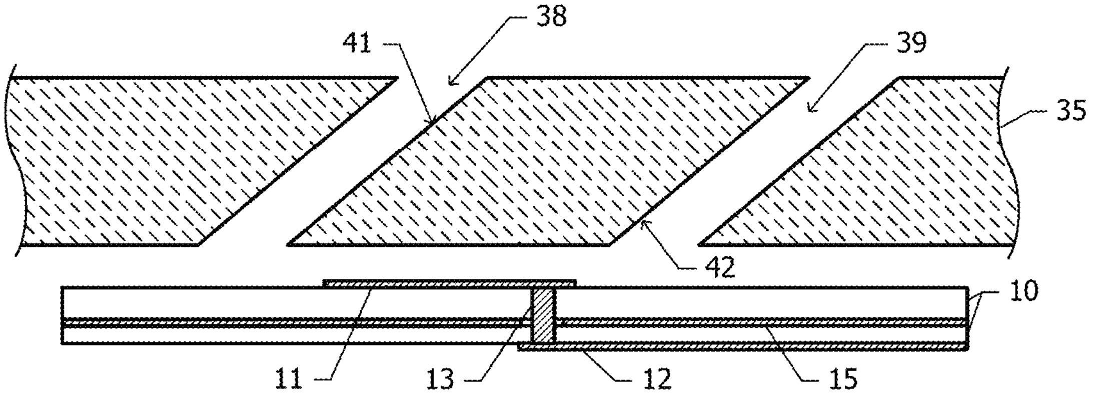

FIG. 15C is a partial sectional view of a communication apparatus according to another modified example of the eighth embodiment. In this modified example, two slits 38 and 39 are formed in the housing 35 so that they are parallel with each other and tilt with respect to the top surface of the radiation element 11. The two slits 38 and 39 extend from the inner surface to the outer surface of the housing 35. The atmospheric air fills the slits 38 and 39.

In this modified example, a side surface 41, which is one of the two surfaces of the slit 38, tilting to separate from the substrate 10 functions as the boundary surface 36 of the antenna device of the eighth embodiment (FIG. 15A). A side surface 42, which is one of the surfaces of the slit 39, tilting to be close to the substrate 10 functions as the boundary surface 37 of the antenna device of the eighth embodiment (FIG. 15A). That is, the portion sandwiched between the slits 38 and 39 functions as the high permittivity portion 35A of the antenna device of the eighth embodiment, while the atmospheric air filling the slits 38 and 39 functions as the low permittivity portions 35B of the antenna device of the eighth embodiment. In this modified example, the housing 35 can be formed with a single material without the use of a composite material of two materials whose permittivity are different from each other.

Ninth Embodiment

A communication apparatus according to a ninth embodiment will be described below with reference to FIG. 16.

Figure 16:
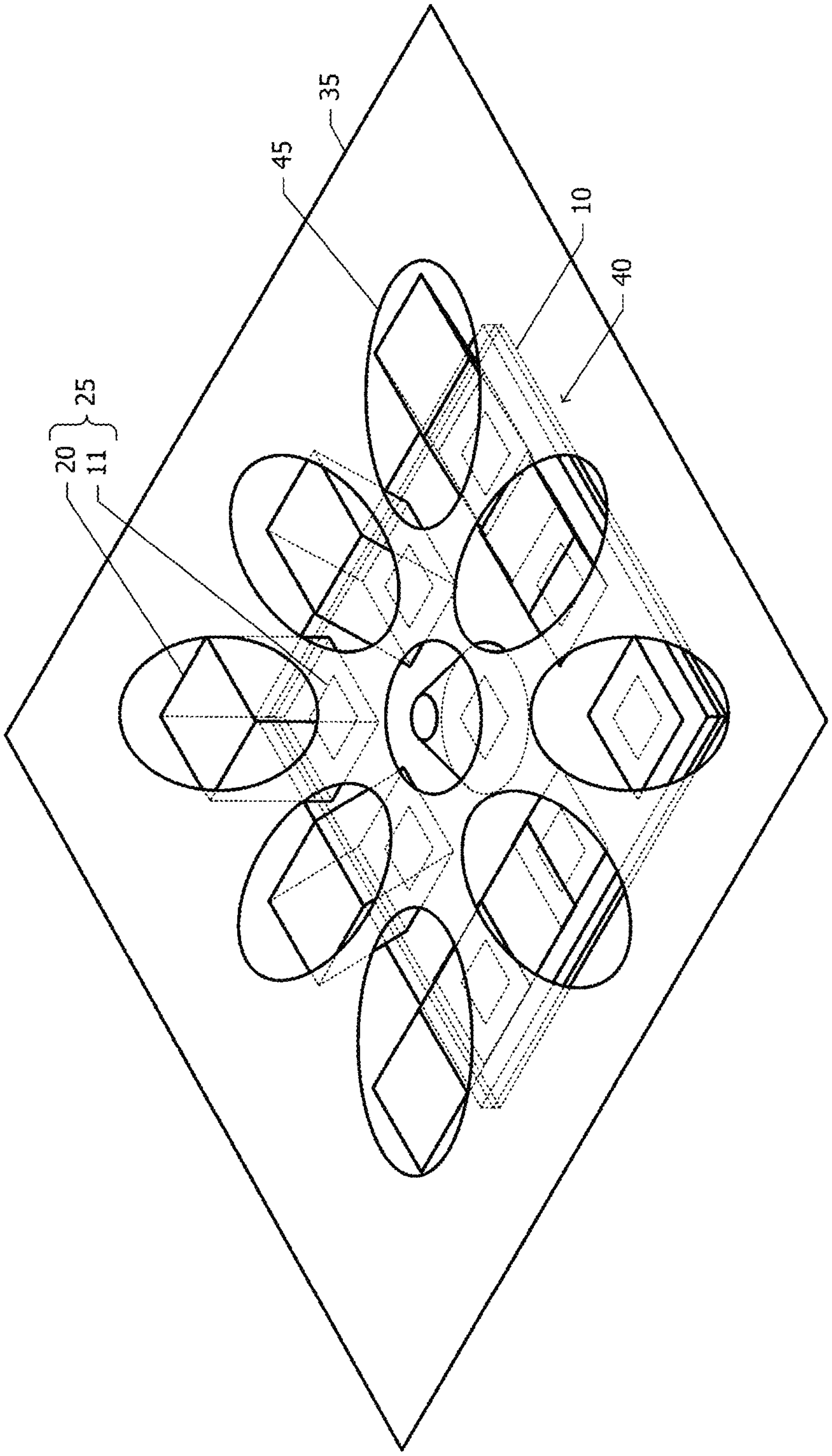
FIG. 16 is a partial perspective view of a communication apparatus according to a ninth embodiment.

FIG. 16 is a partial perspective view of the communication apparatus of the ninth embodiment. The communication apparatus of the ninth embodiment includes a housing 35 and an antenna device 40 stored in the housing 35. In FIG. 16, only part of the housing 35 is shown. As the antenna device 40, the antenna device of the fourth embodiment (FIGS. 8 and 9) is used.

Part of the housing 35 opposes the top surface of the substrate 10 of the antenna device 40 with a spacing therebetween. The portion of the housing 35 opposing the top surface of the substrate 10 (hereinafter such a portion will be called an antenna opposing portion) is formed of a conductive material, such as a metal. Multiple apertures 45 are formed at the antenna opposing portions of the housing 35. The multiple apertures 45 are located in association with the respective element units 25 each constituted by a radiation element 11 and a dielectric member 20. As viewed from above, the apertures 45 each have a shape of an ellipse or a racetrack extending in the tilting direction of the dielectric member 20 from the region where the radiation element 11 is disposed. The aperture 45 associated with the central element unit 25 is circular.

Advantages of the ninth embodiment will be described below.

In the ninth embodiment, radio waves emitted from the radiation elements 11 are not blocked by the housing 35 made of a metal, for example, and are instead radiated to a space outside the housing 35 via the associated apertures 45. As viewed from above, the apertures 45 each have an elongated shape extending in the tilting direction of the dielectric member 20 from the region where the radiation element 11 is disposed. Radio waves emitted in a direction leaning from the direction of a normal line to the radiation element 11 can thus be radiated efficiently to the outside of the housing 35. It is preferable that the apertures 45 be each formed in size and shape which covers a 3-dB beamwidth of the associated radiation element 11.

Modified examples of the ninth embodiment will be explained below.

Although the apertures 45 have a shape of an ellipse or a racetrack in the ninth embodiment, they may have a different shape. In the ninth embodiment, the apertures 45 are open, but they may be closed with the dielectric member.

The above-described embodiments are only examples. The configurations described in different embodiments may partially be replaced by or combined with each other. Similar advantages obtained by similar configurations in plural embodiments are not repeated in the individual embodiments. The present disclosure is not restricted to the above-described embodiments. It is to be understood that variations, improvements, and combinations, for example, will be apparent to those skilled in the art.

REFERENCE SIGNS LIST

10 substrate
11 radiation element
12 feed line
13 via-conductor
15 ground conductor
17 adhesive layer
20 dielectric member
21 parasitic element
22 orientation of tilt
25 element unit
30 sealing resin
35 housing
35A high permittivity portion
35B low permittivity portion
36, 37 boundary surface
38, 39 slit
40 antenna device
41, 42 side surface of a slit
45 aperture

The invention claimed is:

1. An antenna device comprising:

a substrate;

a patch antenna including a radiation element and a ground conductor, the radiation element being disposed in or on the substrate, the ground conductor being disposed in or on the substrate; and a dielectric member that is disposed to at least partially cover, in a plan view, the radiation element, and is disposed on a side opposite a side on which the ground conductor is disposed as viewed from the radiation element; and a body of resin material that covers one or more sides of the dielectric member that are not in contact with the ground conductor or substrate, wherein, under a condition that a direction of a normal line to the radiation element is assumed as a height direction, a top surface of the dielectric member is parallel to a bottom surface of the dielectric member, and a line which links centroids of horizontal sectional surfaces of the dielectric member in the height direction leans with respect to the direction of the normal line to the radiation element.

2. The antenna device according to claim 1, wherein a dielectric constant of the body of resin material is different than a dielectric constant of the dielectric member.

3. The antenna device according to claim 2, wherein the dielectric constant of the dielectric member is higher than that of the dielectric constant of the body of resin material.

4. The antenna device according to claim 3, wherein the radiation element, the dielectric member and the body of resin material collectively form an element unit, and the antenna device further comprises a plurality of the element units disposed on the substrate so as to form an array antenna, and wherein lines which link centroids of parallel horizontal sectional surfaces for respective of the plurality of dielectric members in the height direction tilt outward, with respect to a direction normal to a principal surface of the substrate, as viewed from a centroid of the array antenna.

5. The antenna device according to claim 3, further comprising:

a parasitic element that is disposed in the dielectric member and is coupled with the radiation element.

6. The antenna device according to claim 2, wherein the radiation element, the dielectric member and the body of resin material collectively form an element unit, and the antenna device further comprises a plurality of the element units disposed on the substrate so as to form an array antenna, and wherein lines which link centroids of parallel horizontal sectional surfaces for respective of the plurality of dielectric members in the height direction tilt outward, with respect to a direction normal to a principal surface of the substrate, as viewed from a centroid of the array antenna.

7. The antenna device according to claim 2, further comprising:

a parasitic element that is disposed in the dielectric member and is coupled with the radiation element.

8. The antenna device according to claim 1, wherein the dielectric member is formed in a shape of a parallelepiped.

9. The antenna device according to claim 8, wherein the radiation element, the dielectric member and the body of resin material collectively form an element unit, and the antenna device further comprises a plurality of the element units disposed on the substrate so as to form an array antenna, and wherein lines which link centroids of parallel horizontal sectional surfaces for respective of the plurality of dielectric members in the height direction tilt outward, with respect to a direction normal to a principal surface of the substrate, as viewed from a centroid of the array antenna.

10. The antenna device according to claim 8, further comprising:

a parasitic element that is disposed in the dielectric member and is coupled with the radiation element.

11. The antenna device according to claim 1, wherein the dielectric member has the bottom surface, the top surface, and side surfaces, the top surface that is parallel to the bottom surface has a quadrilateral shape and is on an opposite side of the dielectric member as the bottom surface, the side surfaces connect the bottom surface and the top surface with each other, and, among the side surfaces, two side surfaces are connected to each other by at least two adjacent sides of the top surface are perpendicular to the bottom surface, while at least one of the remaining side surfaces tilts with respect to the bottom surface.

12. The antenna device according to claim 11, wherein the radiation element, the dielectric member and the body of resin material collectively form an element unit, and the antenna device further comprises a plurality of the element units disposed on the substrate so as to form an array antenna, and wherein lines which link centroids of parallel horizontal sectional surfaces for respective of the plurality of dielectric members in the height direction tilt outward, with respect to a direction normal to a principal surface of the substrate, as viewed from a centroid of the array antenna.

13. The antenna device according to claim 11, further comprising:

a parasitic element that is disposed in the dielectric member and is coupled with the radiation element.

14. The antenna device according to claim 1, wherein the radiation element, the dielectric member and the body of resin material collectively form an element unit, and the antenna device further comprises a plurality of the element units disposed on the substrate so as to for an array antenna, and wherein lines which link centroids of parallel horizontal sectional surfaces for respective of the plurality of dielectric members in the height direction tilt outward, with respect to a direction normal to a principal surface of the substrate, as viewed from a centroid of the array antenna.

15. The antenna device according to claim 1, further comprising:

a parasitic element that is disposed in the dielectric member and is coupled with the radiation element.

16. A communication apparatus comprising:

a housing; and an antenna device contained in the housing, the antenna device including a substrate, and a patch antenna including a radiation element and a ground conductor, the radiation element being disposed in or on the substrate, the ground conductor being disposed in or on the substrate, wherein the housing has a boundary surface, a permittivity of one side of the boundary surface being different from a permittivity of another side of the boundary surface, a high permittivity region on the one side of the boundary surface and a low permittivity region on the another side of the boundary surface being separated from each other by the boundary surface in an in-plane direction of the radiation element, the high permittivity region having another surface that does not oppose the low permittivity region and is at least partially covered by a body of resin material, the boundary surface tilts with respect to a top surface of the radiation element, the top surface being parallel to a bottom surface of the radiation element, and at least part of the boundary surface overlaps at least part of the radiation element from a plan view.

17. The communication apparatus according to claim 16, wherein, from the plan view, the boundary surface tilts so as to enter the inside of the radiation element from the outside of the radiation element as the boundary surface separates from the radiation element toward a direction of a normal line to the radiation element, and the permittivity of a region on one side of the boundary surface closer to the radiation element is higher than the permittivity of a region on the another side of the boundary surface.

18. The communication apparatus according to claim 16, wherein one side of the boundary surface is a dielectric, and the other side of the boundary surface is one of atmospheric air and the body of resin material.

19. The communication apparatus according to claim 16, wherein a dielectric constant of the body of resin material is different than a dielectric constant of the high permittivity region.

20. The communication apparatus according to claim 19, wherein the dielectric constant of the high permittivity region is higher than that of the dielectric constant of the body of resin material.

* * * * *